(12) United States Patent
Booth

(10) Patent No.: US 11,788,293 B2
(45) Date of Patent: Oct. 17, 2023

(54) COMPOSITE SHIELD ROOFING SYSTEM

(71) Applicant: Brian Booth, Quinlan, TX (US)

(72) Inventor: Brian Booth, Quinlan, TX (US)

(*) Notice: Subject to any disclaimer, the term of this patent is extended or adjusted under 35 U.S.C. 154(b) by 357 days.

(21) Appl. No.: 16/880,987

(22) Filed: May 22, 2020

(65) Prior Publication Data

US 2021/0363756 A1   Nov. 25, 2021

(51) Int. Cl.
*E04D 7/00* (2006.01)
*E04D 11/02* (2006.01)

(52) U.S. Cl.
CPC .............. *E04D 7/005* (2013.01); *E04D 11/02* (2013.01)

(58) Field of Classification Search
CPC ............ E04D 7/00; E04D 7/005; E04D 11/02
See application file for complete search history.

(56) References Cited

U.S. PATENT DOCUMENTS

| | | | | |
|---|---|---|---|---|
| 2,619,920 A | * | 12/1952 | Lindquist | E04D 11/02 52/12 |
| 2,695,257 A | * | 11/1954 | Castellani | E04D 11/02 404/97 |
| 5,557,896 A | * | 9/1996 | Imeokparia | E04D 11/02 52/517 |
| 9,273,228 B1 | * | 3/2016 | Hyer | C09J 195/00 |
| 2003/0192456 A1 | * | 10/2003 | Yap | C08K 3/34 106/277 |
| 2003/0193127 A1 | * | 10/2003 | Ishibashi | B65H 3/5261 271/121 |
| 2007/0049664 A1 | * | 3/2007 | Partanen | C08L 95/005 524/60 |
| 2016/0130473 A1 | * | 5/2016 | Boddy | C08L 9/02 524/60 |

* cited by examiner

*Primary Examiner* — William V Gilbert
(74) *Attorney, Agent, or Firm* — Amber Marie Crum Whigham

(57) ABSTRACT

Provided is a seamless composite roofing system for a gravel built up surface. The system includes a first fluid application flood coat of bentonite emulsion applied over a gravel built up surface at a rate of 15 gallons per 100 square feet and a second fluid application flood coat of bentonite emulsion applied at a rate of 10 gallons per 100 square feet. The second flood coat includes approximately 3 to 6 pounds of chopped reinforced fiberglass per 100 square feet, and is applied over the first flood coat after the first flood coat cures. A fiberglass reinforcement layer with approximately 3 to 6 pounds chopped reinforced fiberglass per 100 square feet is applied over an area surrounding any roof top penetrations, followed by an elastic trowel grade mastic layer. An asphalt primer is then applied over the second flood coat, followed by a reflective Energy Star Rated top coat.

20 Claims, 2 Drawing Sheets

COMPOSITE SHIELD ROOFING SYSTEM

FIELD OF THE INVENTION

The instant disclosure relates generally to roofing systems, and in particular, roofing systems for industrial or commercials buildings.

BACKGROUND

Traditional roofing systems have been applied by application of various layers with seams. Gravel built up roofs are a traditional style of a flat roof. Those of ordinary skill in the art have been installing gravel built up roofing systems to industrial and commercial buildings for years. Due to weathering over time caused by the natural elements including ultraviolet (UV) rays, strong wind, rain, snow, and/or hail, those of ordinary skill in the art have often installed and/or recommended an upgrade of existing gravel built up roofing systems to further increase durability of a pre-existing gravel built up roof, prolong the lifespan of a roof, provide additional energy savings, or to meet updated industry standards.

Unfortunately, installation of various roofing specifications over an existing gravel built up can be difficult. For instance, bridging, fish mouths, and open seams may occur as roofing layers move, weaken, or warp over time. Accordingly, embodiments of a roofing system and methods of applying a roofing system have been designed to overcome such problems.

SUMMARY

The instant disclosure provides a seamless composite roofing system and a method of applying a seamless composite roofing system over a gravel built up surface. In an embodiment, a method for applying a seamless composite roofing system includes preparing a gravel built up surface for fluid application of a composite roofing system, applying a first flood coat of bentonite emulsion to the prepared gravel built up surface at a rate of 15 gallons per 100 square feet, and applying a second flood coat of bentonite emulsion and approximately 3 to 4 pounds of chopped reinforced fiberglass per 100 square feet thereover. In an embodiment, the second flood coat is applied at a rate of 10 gallons per 100 square feet via a spraying device, and the chopped reinforced fiberglass is sprayed out of a pneumatic gum to combine with the bentonite emulsion in midair during application. In another embodiment, a chopped fiberglass layer comprising approximately 3 to 6 pounds of chopped reinforced fiberglass per 100 square feet is applied to an area around at least one roof top penetration for reinforcement during application of the second flood coat. The area surrounding the roof top penetration may further be coated with an elastic trowel grade mastic to ensure watertight integrity. In another embodiment, an asphalt primer is applied after the second flood coat has cured and then a top coat is applied over the asphalt primer. In various embodiments, application of the asphalt primer layer is dependent on a slope of the gravel built up surface such that if the gravel built up comprises a slope of at least one quarter inch per one foot, an elastomeric acrylic roof coating may be applied. In other embodiments, a silicone roof coating and corresponding primer may be applied.

BRIEF DESCRIPTION OF THE DRAWINGS

Figure 1:
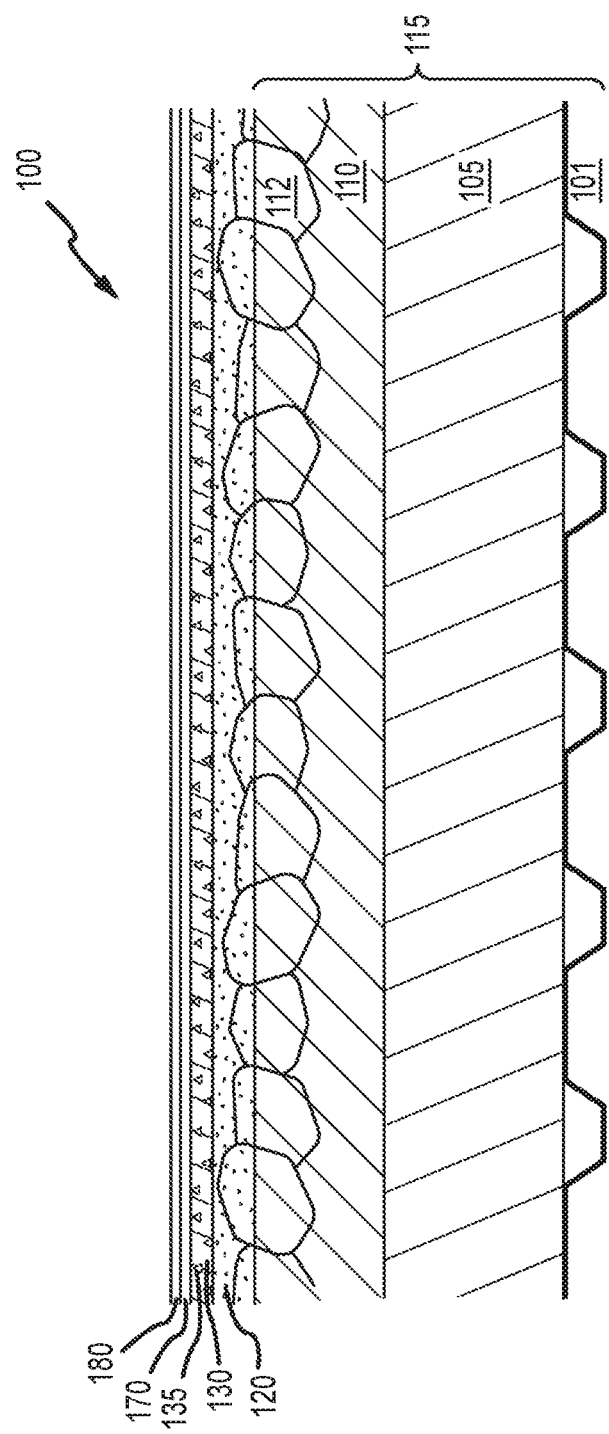
Figure 2:
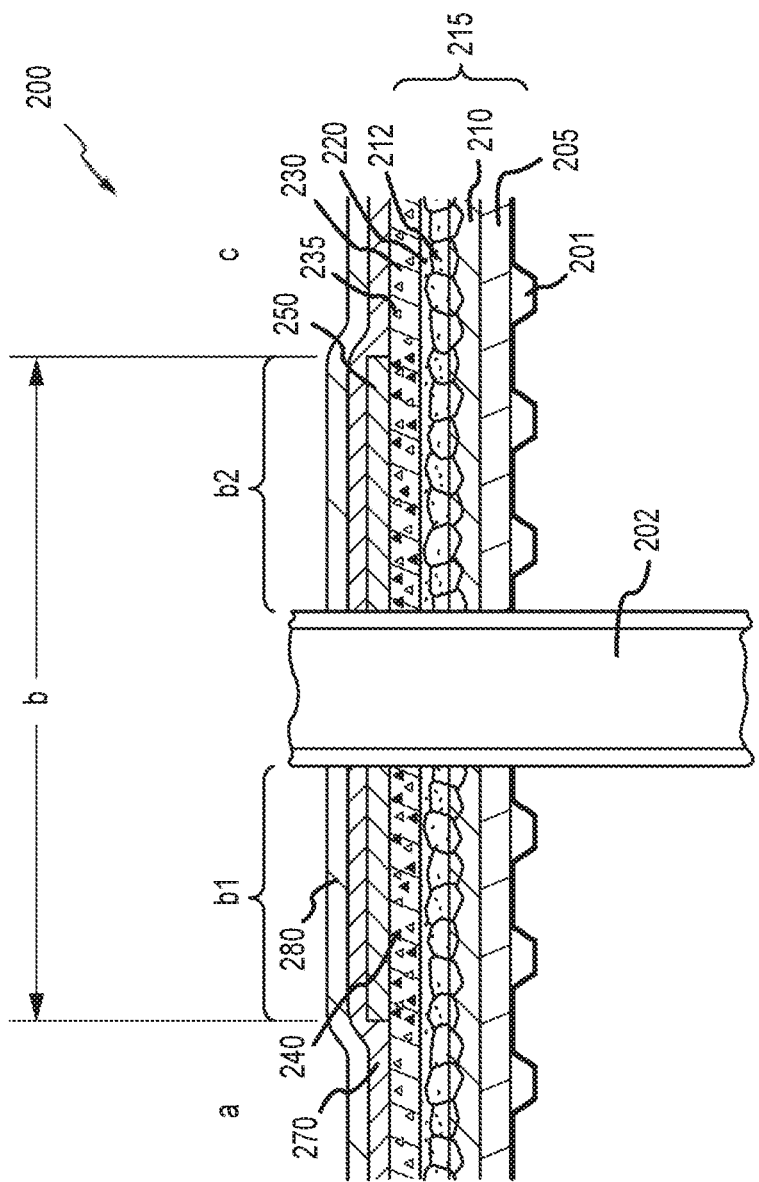

Having thus described examples of the disclosure in general terms, reference will now be made to the accompanying drawings, which are not necessarily drawn to scale, and wherein like reference characters designate the same or similar parts throughout the views. The particular objects and features of the instant disclosure as well as the advantages related hereto will become apparent from the following description taken in connection with the accompanying drawings, and wherein:

FIG. 1 is an illustration of a composite roofing system applied over a gravel built up surface according to an embodiment of the disclosure; and FIG. 2 is an illustration of a composite roofing system applied over a gravel built up surface having at least one penetration according to another embodiment of the disclosure.

The following description of the disclosed embodiments of this disclosure is intended to enable someone skilled in the prior art to make and use that which is disclosed, but is not intended to limit the claims to these particular exemplary embodiments.

DETAILED DESCRIPTION

The following description of the disclosed embodiments of this disclosure is intended to enable someone skilled in the prior art to make and use that which is disclosed, but is not intended to limit the claims to these particular exemplary embodiments.

A built-up roof, sometimes called a tar and gravel roof, is a traditional style of a flat roof often found on low-slope commercial or industrial buildings. Built-up roof systems are known by those in the roofing industry as having alternating layers of roofing felt (usually fiberglass) and hot-applied asphalt. Gravel is embedded into the top coat of asphalt to create what is known as a flood coat, which helps the gravel stay in place. This weatherproofing layer of gravel is believed to give a roof's surface a longer life and help prevent cracking, blistering, and other unfavorable conditions that could lead to leaks and other material defects over time. While the asphalt waterproofs the roof, a highly important function for flat roofs, the gravel also provides a life-extending additional layer to the overall roofing system.

An additional benefit of the gravel in a top layer of a built-up roof system is that the gravel both holds and releases heat. Thus, the gravel can help water to evaporate and also keep heat away from the underlying roof structure. Gravel also provides a better gripping surface for any foot traffic when conducting repairs or maintenance. The gravel also acts as a protective measure to trap and prevent leaves and other natural debris from flowing towards and clogging the drains on a flat roof.

The alternating layers of roofing asphalt and asphalt felts are commonly installed such that the multiple interwoven plies form a roofing membrane. An exemplary built up surface, as could be utilized by the disclosed embodiments of composite roofing systems as a base roofing surface, may include applications of insulation mechanically fastened or sprinkle mopped with hot asphalt. The built up may include plies of ply four and ply six rolls of thirty-three-inch fiberglass felts set in between twenty-five to thirty pounds of hot asphalt. A flood coat of sixty pounds of hot asphalt per one hundred square feet may be added thereupon. Finally, four hundred pounds of gravel per one hundred square feet may be added to the flood coat of hot asphalt.

Those of ordinary skill in the art have often installed and/or recommended an upgrade of existing gravel built up roofing systems to further increase durability or prolong lifespan of a roof, to provide additional energy savings, or to meet updated industry standards. For example, Western Colloid product #298 (hereinafter "Product #298) is an asphaltic bentonite clay emulsion product for use as a water proofing compound and surface coating. When cured, Product #298 resists checking and cracking. The dry film remains flexible and is not meant to easily sag, flow, or re-emulsify. Unblown soft asphalts help improve the weathering characteristics of Product #298 as well as enhance resistance to industrial pollutants, contaminants, and corrosives. An asphalt emulsion layer, such as Product #298, may be used as a surface protectant or as a waterproofing compound using polyester, for example, Owens Corning's PulStrand® 4100.

Embodiments of a seamless composite roofing system applied over a gravel built up surface are herein disclosed which remove use of a polyester and yield seamless systems that prevent bird nesting, bridging, fish mouths, and open seams which yield further roof problems that ultimately require additional time intensive, costly, and unnecessary roofing fixes or upgrades to protect an interior of a building.

Referring to FIG. 1, an embodiment of a composite roofing system 100 is applied over an existing gravel built up roofing surface 115. As shown, the gravel built up roofing surface 115 includes a built up asphalt surface 110 that has been applied over insulation 105 previously layered over a metal decking 101. In an embodiment, the gravel built up roofing surface 115 comprises gravel 112 embedded into the top coat of asphalt to create a flood coat that makes up the gravel built up roof surface 110 and which helps the gravel 112 stay in place. While commonly called by those of ordinary skill in the art as "gravel," and as will be referred to throughout the instant disclosure as "gravel," the gravel layer 112 is usually some sort of aggregate material such as pea gravel, slap, or mineral granules.

The surface must be prepared for application of the upgraded system. Firstly, the surface must be dry or damp and free of dirt, dust, oil, grease, wax, rust, chalky or loose paint, mildew and any other surface contamination that may inhibit adhesion. That is, the gravel built up surface is dry vacuumed to remove and dispose of all loose gravel, and then wet vacuumed for removal of any dirt and contaminates. In some embodiments, it may be helpful or necessary to further clean the built up surface with water under pressure.

Secondly, any cracks, breaks, open seams, and other roof imperfections must be repaired to ensure watertight integrity of the first flood coat of bentonite emulsion and to mitigate water damage. If any decking is damaged, the damaged decking should be replaced. Moreover, if any wet insulation is found, removal and replacement of the wet insulation with dry insulation may be necessary. Finally, if rust is present is should be removed and scaled and then primed with an appropriate rust primer.

In various embodiments of the composite roofing system 100, a first fluid application flood coat 120 of bentonite emulsion is applied over the prepared, pre-existing gravel built up roofing surface 115 at a rate of 15 gallons per 100 square feet. In an embodiment, the bentonite emulsion may be Western Colloid Asphalt Emulsion Roof Surfacing Product #298, or APOC® 300 Non-Fibered Asphalt Emulsion. As described herein, the bentonite emulsion may be applied to the gravel built up surface manually using a hand held spray device. Alternately, the bentonite emulsion may be applied mechanically or in various ways as known to those of ordinary skill in the art. Upon curing, the first flood coat 120 of bentonite emulsion will provide the roof with a waterproof surface. Normal curing time for the first flood coat is usually between 24 to 48 hours after application. However, since bentonite emulsion is cured by dehydration, exact drying time may vary depending upon wet film thickness, temperature, humidity and air movement.

Referring to FIG. 1, the composite shield roofing system includes a second fluid application flood coat 130 of bentonite emulsion. The second flood coat 130 further includes approximately 3 to 6 pounds of chopped reinforced fiberglass 135 per 100 square feet. Similar to the first flood coat, the bentonite emulsion of the second flood coat is applied via a spraying device. However, the chopped reinforced fiberglass is pulled from a spool and sprayed out of a pneumatic gun to combine with the bentonite emulsion of the second flood coat in midair during application. The first flood coat of bentonite emulsion must be cured before a second flood coat is applied thereover.

In various embodiments, an asphalt primer layer 170 is applied over the second flood coat 130 once the second flood coat of bentonite emulsion and chopped reinforced fiberglass has cured. The asphalt primer layer 170 may be applied at a rate of one half (½) gallon per 100 square feet. Finally, after the asphalt primer layer 170 has cured, a top coat 180 is applied thereover. As those of ordinary skill in the art understand, the asphalt primer layer 170 should correspond with the type of top coat 180 applied. In an embodiment, the top coat may be a reflective top coat. In another embodiment, the top coat may be an Energy Star Rated reflective top coat.

Various embodiments of the disclosed composite roofing system allow for application of different top coats. The top coat 180 depends on a slope of the pre-existing gravel built up roofing surface. That is, if a slope of the pre-existing gravel built up surface 115 is at least one fourth (¼) inch per one foot, the top coat 180 may be an elastomeric acrylic roof coating applied at a rate of four gallons per 100 square feet. Stated differently, there is a minimum slope factor for acrylic top coating. In an embodiment, the elastomeric acrylic roof coating may be one of Western Colloid ElastaHyde #720 ARC White Elastomeric Acrylic Coating, APOC® 247 Sun-Shield® White Reflective Roof Coating, or APOC® 264 FLASH N' SEAL® White Elastomeric Roof & Flashing Sealant. If an elastomeric acrylic roof top coat is applied, the asphalt primer layer corresponding thereto may be one of Western Colloid Product #970 A$_2$A Bonding Primer or APOC® 230 Elastocryl® Premium Acrylic Base Coating.

Alternatively, if a slope of the pre-existing gravel built up surface is less than one fourth (¼) inch per one foot (e.g., ⅛ inch per one foot), the top coat 180 is a silicon roof coating applied at a rate of two gallons per 100 square feet. As those of ordinary skill in the art know, acrylic will blister and peel off a roofing surface if there is ponding water, while silicone is impervious and unaffected by ponding water. Accordingly, a silicone top coat may be applied to a roof with a slope that is less than one fourth (¼) inch per one foot. In an embodiment, the silicon roof coating may be Western Colloid Product S-1000 or APOC® 585 Armor Flex® White Liquid Roof Membrane. If a silicon roof coating is applied, the asphalt primer layer corresponding thereto may be Western Colloid Product #970 A$_2$A Bonding Primer or APOC® 583 ARMOR BASE®.

In another embodiment, a silicon top coat may be applied to a roofing surface having any slope.

Referring now to FIG. 2, the composite shield roofing system 200 may include a gravel built up surface 215 that has at least one roof top penetration 202 that penetrates at least one of a metal decking layer 201, insulation layer 205, and existing built up asphalt layer 210 having gravel 212 embedded therein. In various embodiments, the at least one roof top penetration 202 may be a projection, a curb, pipe, pitch pan, roof drain, scupper, or skylight.

As similar to FIG. 1, the pre-existing gravel built up roofing surface 215 is first prepared for fluid application of the composite roofing system. Then, a first fluid application flood coat of bentonite emulsion 220 is applied over the entire prepared pre-existing gravel built up roofing surface 215 at a rate of fifteen (15) gallons per 100 square feet and allowed to cure.

In an embodiment, a second fluid application flood coat of bentonite emulsion 230 is applied to the cured first flood coat—including areas 'a', 'b', and 'c' in FIG. 2, at a rate of 10 gallons per 100 square feet. In addition to the bentonite emulsion 230, the second flood coat includes approximately 3 to 6 pounds of chopped reinforced fiberglass 235 per 100 square feet. Furthermore, in an area 'b' surrounding a roof top penetration—area 'b' includes areas $b_1$ and $b_2$ and does not include the area of the penetration itself as shown in FIG. 2, an additional approximately 3 to 6 pounds of chopped reinforced fiberglass per 100 square feet is added to the second flood coat. Stated differently, the second flood coat applied to the area surrounding a roof top penetration, includes a total of approximately 6 to 12 pounds of chopped reinforced fiberglass per 100 square feet.

In an embodiment, all 6 to 12 pounds of chopped reinforced fiberglass per 100 square feet may combine with the bentonite emulsion of the second flood coat in midair during application. In another embodiment, an additional 3 to 6 pounds of chopped reinforced fiberglass per one hundred square feet may be added to the area surrounding a roof top penetration after application of the second flood coat, but prior to the second flood coat being cured.

In yet another embodiment, a chopped reinforced fiberglass layer 240 having approximately 3 to 6 pounds of chopped reinforced fiberglass per 100 square feet may be added to the area surrounding a roof top penetration, areas $b_1$ and $b_2$, after the first flood coat is cured, but prior to the application of the second flood coat of bentonite emulsion 230 that has 3 to 6 pounds of chopped reinforced fiberglass 235 per one hundred square feet being applied to the entire roofing surface.

In an embodiment, the chopped fiberglass layer 240 is applied to an area surrounding a roof top penetration that spans approximately 2 feet in each radial direction. That is, each of areas $b_1$ and $b_2$ will have a width of approximately 2 feet or measure a distance of approximately 2 feet from an outside perimeter or outside circumference (depending on the shape) of the roof top penetration. Thus, in various embodiments, regardless whether a roof top penetration comprises a roughly cylindrical shape (e.g. a drain pipe) or a more rectangular shape (e.g. a rectangular skylight), in a cross-sectional view of the roofing layers such as shown in FIG. 2, each of $b_1$ and $b_2$ will be approximately 2 feet wide.

In an embodiment, the second flood coat comprises approximately 3 to 4 pounds of chopped reinforced fiberglass per 100 square feet. In another embodiment, the second flood coat comprises approximately 4 pounds of chopped reinforced fiberglass per 100 square feet.

In an embodiment, the chopped fiberglass layer 240 comprises approximately 3 to 4 pounds of chopped reinforced fiberglass per 100 square feet. In another embodiment, the chopped fiberglass layer comprises 4 to 6 pounds of chopped reinforced fiberglass per 100 square feet.

In yet another embodiment, the second flood coat comprises approximately 3 to 4 pounds of chopped reinforced fiberglass per 100 square feet, and the chopped fiberglass layer comprises approximately 3 to 6 pounds of chopped reinforced fiberglass per 100 square feet.

In various embodiments, an elastic trowel grade mastic coating 250 is applied to the area around the at least one roof top penetration to ensure watertight integrity. The elastic trowel grade mastic coating 250 may be a white elastic trowel grade mastic coating and it may be applied after the second flood coat 230 having the 3 to 6 pounds of chopped reinforced fiberglass 235 therein and having the additional 3 to 6 pounds of chopped reinforced fiberglass 240 being added thereto has cured.

After the elastic trowel grade mastic coating 250 has dried or cured, an asphalt primer layer 270 is applied over the second flood coat 230 uniformly across the roofing surface. In an embodiment, the asphalt primer layer 270 may be applied at a rate one half (½) gallon per 100 square feet. Finally, after the asphalt primer layer 170 has cured, a top coat 280 is applied thereover. As those of ordinary skill in the art understand, the asphalt primer layer 270 should correspond with the type of top coat 280 applied.

As discussed above in relation to FIG. 1, various embodiments of the disclosed composite roofing systems allow for application of different top coats. The top coat 280 depends on a slope of the pre-existing gravel built up roofing surface. That is, if a slope of the pre-existing gravel built up surface 215 is at least one fourth (¼) inch per one foot, the top coat 280 may be an elastomeric acrylic roof coating applied at a rate of four (4) gallons per 100 square feet. Alternatively, if the slope of the pre-existing gravel built up surface 215 is less than one fourth (¼) inch per one foot (for example, ⅛ inch per one foot), the top coat 280 is a silicon roof coating applied at a rate of two gallons per 100 square feet.

In describing the invention, certain embodiments have been used to illustrate the disclosed roofing systems and the applications thereof. However, the invention is not limited to these specific embodiments as other embodiments and modifications within the spirit of the invention will readily occur to those of ordinary skill in the art to which the disclosure pertains having the benefit of the teachings presented in the foregoing descriptions and the associated drawings.

What is claimed is:

1. A method of applying a seamless composite roofing system over a gravel built up surface, the method comprising:
    preparing a gravel built up surface for fluid application of a composite roofing system;
    applying a first flood coat of bentonite emulsion to the gravel built up surface at a rate of 15 gallons per 100 square feet; and
    applying a second flood coat of bentonite emulsion at a rate of 10 gallons per 100 square feet,
        wherein the second flood coat of bentonite emulsion comprises approximately 3 to 6 pounds of chopped reinforced fiberglass per 100 square feet, and
        wherein the first flood coat of bentonite emulsion is cured prior to application of the second flood coat.

2. The method of claim 1, wherein the bentonite emulsion of the second flood coat is applied via a spraying device, and
    wherein the chopped reinforced fiberglass is pulled from a spool and sprayed out of a pneumatic gun to combine with the bentonite emulsion of the second flood coat in midair during application.

3. The method of claim 2, wherein the gravel built up surface comprises at least one roof top penetration, the method further comprising:
    applying a chopped fiberglass layer to an area around the at least one roof top penetration for reinforcement of the at least one roof top penetration, the chopped fiberglass layer comprising approximately 3 to 6 pounds of chopped reinforced fiberglass per 100 square feet; and coating the area around the at least one roof top penetration with an elastic trowel grade mastic to ensure watertight integrity.

4. The method of claim 3, wherein the applying the chopped fiberglass layer to the area around the at least one roof top penetration is performed during application of the second flood coat, wherein the approximately 3 to 6 pounds of chopped reinforced fiberglass per 100 square feet of the chopped fiberglass layer is pulled from the spool and sprayed out of the pneumatic gun at a same time as the approximately 3 to 6 pounds of chopped reinforced fiberglass per 100 square feet of the second flood coat, totaling approximately 6 to 12 pounds of chopped reinforced fiberglass per 100 square feet, and wherein the approximately 6 to 12 pounds of chopped reinforced fiberglass per 100 square feet combines with the bentonite emulsion of the second flood coat in midair during application.

5. The method of claim 3 further comprising:
applying an asphalt primer to the gravel built up surface, wherein the asphalt primer is applied at a rate of ½ gallon per 100 square feet; and
applying a top coat over the asphalt primer.

6. The method of claim 5, wherein the gravel built up surface comprises a slope of at least ¼ inch per 1 foot, and wherein the top coat is an elastomeric acrylic roof coating applied at a rate of 4 gallons per 100 square feet.

7. The method of claim 5, wherein the top coat is a silicone roof coating applied at a rate of 2 gallons per 100 square feet.

8. The method of claim 1 further comprising:
applying an asphalt primer layer over the second flood coat, the asphalt primer layer being applied at a rate of ½ gallon per 100 square feet;
in response to a slope of the gravel built up surface being less than ¼ inch per 1 foot, applying a silicon roof coating at a rate of 2 gallons per 100 square feet; and
in response to a slope of the gravel built up surface being in response to a slope of the gravel built up surface being at least ¼ inch per 1 foot, applying an elastomeric acrylic top coating at a rate of 4 gallons per 100 square feet.

9. The method of claim 1, wherein the preparing the gravel built up surface comprises: dry vacuuming the gravel built up surface to remove and dispose of all loose gravel;
wet vacuuming the gravel built up surface for removal of any dirt or contaminates that may inhibit proper adhesion of the first flood coat of bentonite emulsion;
repairing roof imperfections to ensure watertight integrity of the first flood coat of bentonite emulsion and to mitigate water infiltration, wherein the repairing includes replacing damaged decking to ensure structural integrity of the gravel built up surface; and
in response to finding wet insulation, removing and replacing the wet insulation with dry insulation to ensure proper adhesion of the first flood coat.

10. A composite roofing system comprising:
a first fluid application flood coat of bentonite emulsion applied over a gravel built up surface comprising gravel embedded into a top coat of asphalt that has been applied over insulation layered over a metal decking, wherein the first flood coat is applied at a rate of 15 gallons per 100 square feet; and a second fluid application flood coat of bentonite emulsion applied at a rate of 10 gallons per 100 square feet, wherein the second flood coat comprises approximately 3 to 6 pounds of chopped reinforced fiberglass per 100 square feet,
wherein the second flood coat is applied over the first flood coat after the first flood coat is cured, and
wherein the first flood coat and the second flood coat are adjacent layers in the composite roofing system.

11. The composite roofing system of claim 10, wherein the gravel built up surface comprises at least one roof top penetration, the system further comprising:
a fiberglass reinforcement layer applied over an area surrounding the at least one roof top penetration, wherein the fiberglass reinforcement layer comprises approximately 3 to 6 pounds of chopped reinforced fiberglass per 100 square feet; and
an elastic trowel grade mastic layer applied over the area surrounding the at least one roof top penetration.

12. The composite roofing system of claim 10 further comprising:
an asphalt primer layer applied over the second flood coat application at a rate of ½ gallon per 100 square feet; and
a top coat applied over the asphalt primer layer.

13. The composite roofing system of claim 12, wherein the gravel built up surface comprises a slope of at least ¼ inch per one foot, and
wherein the top coat is an elastomeric acrylic roof coating applied at a rate of 4 gallons per 100 square feet.

14. The composite roofing system of claim 12, wherein the top coat is a silicon roof coating applied at a rate of 2 gallons per 100 square feet.

15. The composite roofing system of claim 12, wherein the top coat depends on a slope of the gravel built up surface,
wherein if the slope of the gravel built up surface is at least ¼ inch per 1 foot, the top coat comprises an elastomeric acrylic roof coating applied at a rate of 4 gallons per 100 square feet, and
wherein if the slope of the gravel built up surface is less than ¼ inch per 1 foot, the top coat is a silicon roof coating applied at a rate of 2 gallons per 100 square feet.

16. The composite roofing system of claim 11, wherein the fiberglass reinforcement layer applied to an area surrounding a roof top penetration, the area spanning approximately 2 feet radially outward from an outside perimeter of the base of the roof top penetration.

17. The composite roofing system of claim 10, wherein the gravel built up surface is prepared prior to the first fluid application flood coat of bentonite emulsion including being dry vacuumed to remove loose gravel, wet vacuumed for removal of any dirt or contaminates that may inhibit proper adhesion of the first flood coat, repairs made to any roof imperfections to ensure watertight integrity of the first flood coat and to mitigate water infiltration, and replacement of any damaged decking.

18. The composite roofing system of claim 10, wherein the bentonite emulsion of the second flood coat is applied via a spraying device,
wherein the chopped reinforced fiberglass of the second flood coat is pulled from a spool and sprayed out of a pneumatic gun to combine with the bentonite emulsion of the second flood coat in midair during application, and wherein the chopped reinforced fiberglass of the fiberglass reinforcement layer is pulled from the spool and sprayed out of the pneumatic gun.

19. A composite roofing system for a gravel built up surface comprising gravel embedded into a top coat of asphalt that has been applied over insulation layered over a metal decking and at least one roof top penetration, the system comprising:
- a first fluid application flood coat of bentonite emulsion applied over the gravel built up surface at a rate of 15 gallons per 100 square feet;
- a second fluid application flood coat of bentonite emulsion applied at a rate of 10 gallons per 100 square feet,
  wherein the second flood coat comprises approximately 3 to 6 pounds of chopped reinforced fiberglass per 100 square feet,
  wherein the second flood coat is applied over the first flood coat after the first flood coat is cured, and
  wherein the first flood coat and the second flood coat are adjacent layers in the composite roofing system;
- a fiberglass reinforcement layer applied over an area surrounding the at least one a roof top penetration, wherein the fiberglass reinforcement layer comprises approximately 3 to 6 pounds of chopped reinforced fiberglass per 100 square feet;
- an elastic trowel grade mastic layer applied over the area surrounding the at least one roof top penetration;
- an asphalt primer layer applied over the second flood coat application at a rate of ½ gallon per 100 square feet; and
- a top coat applied over the asphalt primer layer,
  wherein if a slope of the gravel built up surface is at least ¼ inch, the top coat comprises an elastomeric acrylic roof coating applied at a rate of 4 gallons per 100 square feet, and
  wherein if the slope of the gravel built up surface is less than ¼ inch, the top coat is a silicon roof coating applied at a rate of 2 gallons per 100 square feet.

20. The composite roofing system of claim 19, wherein the bentonite emulsion of the second flood coat is applied via a spraying device,
  wherein the chopped reinforced fiberglass of the second flood is pulled from a spool and sprayed out of a pneumatic gun to combine with the bentonite emulsion of the second flood coat in midair during application, and
  wherein the chopped reinforced fiberglass of the fiberglass reinforcement layer is pulled from a spool and sprayed out of the pneumatic gun to combine with the bentonite emulsion of the second flood coat in midair during application of the second flood coat in the area surrounding the at least one roof top penetration.

* * * * *